Dec. 13, 1966  C. R. WOODBURN  3,291,234
VEHICLE WEIGHER USING HYDRAULIC JACKS WITH
ELECTRIC LOAD CELLS
Filed April 12, 1966
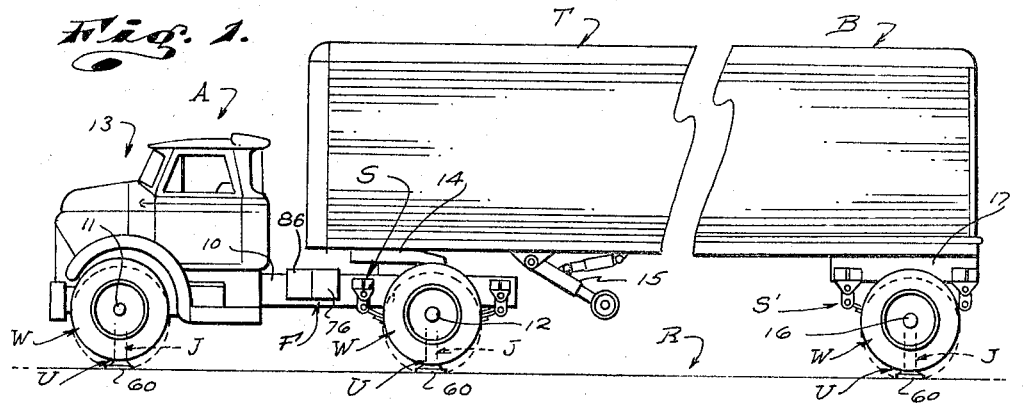
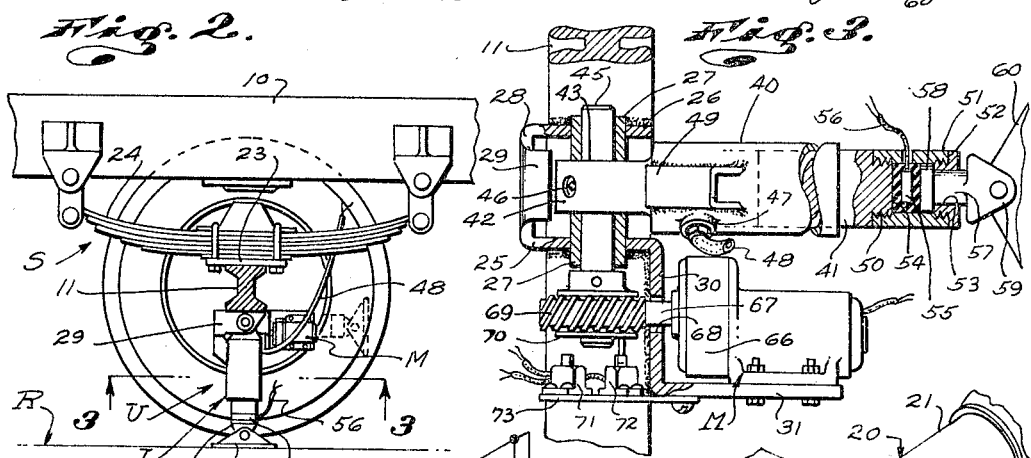
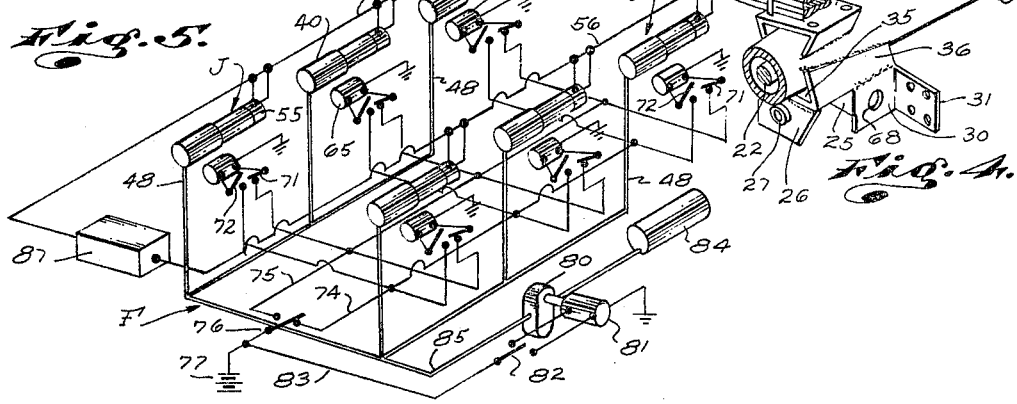
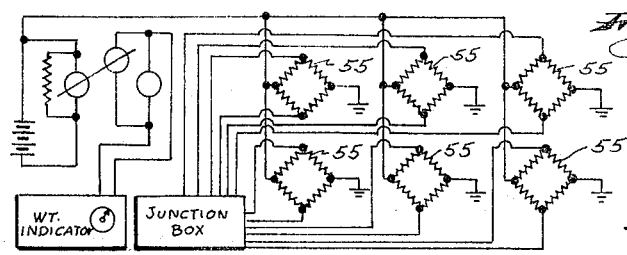
Inventor
Charles R. Woodburn
By
George C. Purnell
Attorney

United States Patent Office 3,291,234
Patented Dec. 13, 1966

3,291,234
VEHICLE WEIGHER USING HYDRAULIC JACKS WITH ELECTRIC LOAD CELLS
Charles R. Woodburn, 440 Terraine, Long Beach, Calif.
Filed Apr. 12, 1966, Ser. No. 542,141
13 Claims. (Cl. 177—136)

This invention has to do with an apparatus for weighing vehicles and is more particularly concerned with apparatus for accurately determining the gross weight of cargo carrying motor vehicles commonly referred to and hereinafter termed "trucks."

The want and the need for a suitable means, applicable to a truck, for determining the weight of the truck or its cargo is extremely old and has resulted in the proposal and development of a great number of novel structures and ideas.

In spite of the extremely old and highly developed or crowded state-of-the-art and in spite of the ever increasing need and demand for such means, no such means has, to date, been developed which is satisfactory, dependable and commercially feasible or practical.

The reasons for having, and the advantages to be attained by such means are so obvious and apparent and have been expounded upon to such an extent by the prior art, that discussion and consideration thereof can and will be dispensed with.

The truck weighing means provided by the prior art can be divided into several basic ideas of means. The first, most common of such ideas of means has been the provision of means to measure the deflection of the resilient suspension system provided on the trucks, between the axles and the frame of the trucks. In carrying out this idea, strain gauges and the like have been applied to the springs of the suspension systems to measure their deflection. Further, electrical or mechanical linear measuring devices have been provided between the axles and the frames of the trucks, which devices are intended to indirectly measure the extent to which the springs of the suspension systems have been flexed.

Such means have proven to be unsatisfactory due to the fact that the springs of the suspension systems do not afford constant and uniform resistance to the forces exerted onto and through them, but are subject to extreme variations as a result of fatigue, load deflection, interference with collateral mechanisms, such as shock absorbers, and as a result of environmental conditions, such as temperature changes.

Another idea of means provided by the prior art to weigh the cargo on trucks involves the provision of weight-force measuring devices between the frames of the trucks and their cargo supporting beds.

Such means have involved the provision electrical force sensing means, such as load cells, or the like, with appropriate circuitry, suitably related to the mounting means between the truck frames and their beds. This general class or type of means has proven to be wanting or unsatisfactory since it does not and cannot provide the operator of the truck with the gross weight of the vehicle, but can only provide the operator with the weight of the truck bed and the cargo supported thereby. Further, such means have proven to be unsatisfactory since they require that the trucks with which they are related be modified to a substantial extent. That is, they require that the standard mounting means provided between the beds and the frames of the trucks be rebuilt or be replaced by special mounting means, which means are normally replete with undesirable features.

Another weight indicating means provided for trucks, and which is disclosed in my Patent No. 3,241,626, issued March 22, 1966, involves the provision of load cell type force sensing devices, with appropriate circuitry, arranged between direct load transmitting members and/or parts of truck suspension systems or means. Such a combination and relationship of parts would be extremely satisfactory, but for the fact that the entire weight of the truck is not determinable and the load cells are constantly subjected to the forces transmitted through the suspension systems, which forces include dynamic forces of extreme magnitude when the trucks are operated over rough roadbeds and the like. To date, transducers or load cells which can satisfactorily withstand such treatment have not been developed to a degree that such truck weighing means can be produced satisfactorily and economically.

Further, the last-mentioned type of means is not readily acceptable to the trucking industry as it requires that the suspension means of the trucks be worked upon and modified to such an extent or degree that the truck manufacturers' warranties would be forfeited and to such an extent or degree that the truckers insurance may be adversely affected.

Hydraulic jacks, with pressure gauges related thereto have been engaged on the frames of trucks, to elevate the trucks clear of the ground. When the trucks are jacked up, the operator, by reading the fluid pressure in the jacking system, is supposed to be able to determine the gross weight of the truck. Such means are wanting as the fluid pressures encountered are subject to wide variations in response to temperature changes and the like. Further, jacking the trucks up, clear of the ground, by their frames, requires jacks of considerable length to bridge the space between the frames and the roadbed on which the trucks are supported. Still further, the frames must be elevated a substantial distance above the roadbed before the suspension systems between the frames and the wheel and axle assemblies are reverse-stressed to a sufficient extent to lift and support the wheels clear and above the roadbed.

An object of my invention is to provide a novel truck weighing apparatus.

Another object of this invention is to provide a jack-type weighing apparatus of the character referred to which is related to the axles of a truck, whereby the truck is lifted by its axles and only needs to be elevated a short distance to clear the wheels from the roadbed.

It is a further object of this invention to provide a means of the character referred to having hydraulic jack units with electrical load cells related thereto, whereby the forces exerted onto and through the jack units are directed through their related load cells.

It is an object of this invention to provide novel, motor-operated, retractable jack units, which units are small, sturdy and dependable and are such that they can be related to all standard or conventional axle structures without requiring rebuilding of the axles or other parts and/or portions of the trucks with which they are related.

It is another object of my invention to provide an apparatus of the character referred to which involves the application of a jack unit adjacent each end of each axle of a truck and which involves a suitable circuit related to the load cells of the jack units to transpose the forces exerted through the jacks into suitable weight units.

The above and other objects and features of my invention will be fully understood from the following detailed description of a typical preferred form and application of the invention, throughout which description reference is made to the accompanying drawings, in which:

FIG. 1 is a side elevation of a truck with my apparatus related thereto;

FIG. 2 is a view showing a jack unit that I provide related to a truck axle;

FIG. 3 is an enlarged view taken substantially as indicated by line 3—3 on FIG. 2, with the jack unit raised in the horizontal position and with parts broken away to better illustrate details of the construction;

FIG. 4 is an isometric view of a portion of another form of axle structure with a portion of my new jack unit related thereto;

FIG. 5 is a diagrammatic view of the electrical and hydraulic systems provided by this invention; and FIG. 6 is a diagrammatic view of a circuitry as employed in my apparatus.

The apparatus that I provide is adapted to be related to a truck and is adapted to lift and weigh the truck when desired.

The apparatus is such that it can be related to any conventional truck construction.

For the purpose of illustration, I have, in FIG. 1 of the drawings, shown my apparatus related to a conventional tractor and trailer type of truck or trucking rig T.

The truck or rig T involves a tractor unit A and a trailer unit B.

The tractor unit A involves an elongate, horizontal frame 10 having front and rear ends. The unit A further includes transversely extending front and rear axles 11 and 12 with road engaging wheels W at their opposite ends; elliptical spring-type suspension means S between the axles and the frames; a suitable unitary engine housing and driver's cab 13 at the forward end of the frame and a fifth wheel unit 14 at the rear of the frame to connect with the trailer unit.

The several axles of the truck can be of any standard or conventional design. In FIGS. 2 and 3 of the drawings, I have shown the axle 11 as an I-beam type axle, such as is commonly employed for the front axles of trucks and for the axles for trailers.

In FIG. 4 of the drawings, I have shown a portion of a typical drive axle structure 20, which structure includes a tubular load supporting axle housing 21 and an axle shaft 22 extending through the housing.

For the purpose of this disclosure, the housing 21 can and will be considered as an axle.

In accordance with common practice, the axles are provided with upwardly disposed mounting pads 23 at their opposite end portions and on which the related parts and/or portions of the suspension means S, occurring between the axles, and the truck or trailer frames, are seated and fixed. In the case illustrated, the pads 23 are shown engaging and supporting the belly portions of elliptical springs 24 of the suspension means provided.

The apparatus that I provide includes a plurality of like jack units U, there being one such unit related to each end portion of each axle.

Each unit U includes a frame F formed of a single length or strip of steel plate and adapted to be fixed to the lower side of the axle with which the unit is related.

The frame F defines a pair of vertical, laterally spaced, plate portions, there being an inner portion 25 and an outer portion 26. The portions 25 and 26 are provided with axially aligned apertures in which are fixed bearing sleeves 27 to rotatably support a carrier shaft, which will hereinafter be described.

The plate portions extend normal to the longitudinal axis of the axle and are connected together by a flat, vertical, laterally extending web portion 28. The web portion 28 is integrally joined with the forward ends of the plate portions.

The web portion 28 is provided with a rearwardly turned flange-like projection at its lower edge, which projection defines a downwardly disposed stop 29.

In addition to the foregoing, the frame F has a vertical, laterally inwardly projecting intermediate portion 30 integrally joined with the rear edge of the inner plate portion 25 and has a vertical, rearwardly projecting motor mounting pad portion 31 at the inner end of said intermediate portion.

The several portions 25 through 31 of the frame F are established of a single length of strap iron or plate and are such that their upper edges occur in a common plane.

The frame F, when related to an I-beam axle 11, as illustrated in FIGS. 2 and 3 of the drawings, is positioned with its upper edge or edges adjacent the bottom surface of the axle and is fixed thereto as by welding.

In those cases where the frame is fixed to a round axle or axle housing, such as is illustrated in FIG. 4 of the drawings, I provide a flat, horizontal mounting pad 35 which is fixed to the axle or axle housing and which provides a suitable flat surface on which the frame can be fixed, as by welding.

In the case illustrated, the pad is provided with a suitable flange portion 36 to facilitate it being fixed to the axle or axle housing and is not unlike the standard or conventional spring mounting pad provided on such axles or axle housings as standard equipment.

In practice, a mounting pad can be provided between the frame F and the related I-beam type of axle without departing from the spirit of this invention.

Each jack unit U further includes an elongate, hydraulic jack J having an inner, normally horizontally disposed cylinder 40 extending rearwardly from its related axle and an elongate ram 41 slidably engaged in and projecting rearwardly from the cylinder.

The forward end of the cylinder 40 is provided with a forwardly projecting plate-like head 42 having a transversely extending aperture 43 therein. The cylinder 40 is arranged rearward of the frame F with the head 42 projecting forwardly between the bearing sleeves 27, with the aperture 43 therein, in axial alignment with said sleeves.

An elongate, horizontal, laterally extending pivot shaft 45 is engaged through the aperture 43 in the head and has end portions which are pivotally engaged in and project through the bearing sleeves 27 carried by the frame. The shaft is fixed against rotation relative to the jack J by means of a set screw 46 carried by the head and engaging said shaft.

In addition to the foregoing, the cylinder 40 is provided with an inlet and outlet port 47 adjacent its head end and in which a suitable fluid conducting line 48 is engaged.

The head end portion of the cylinder is further provided with a normally downwardly projecting stop member 49, which member is adapted to engage and stop against the stop 29 on the frame, when the cylinder is rotated downwardly to a vertical operating position between the axle 11, as clearly illustrated in FIG. 2 of the drawings.

The ram 41 is provided with a threaded pin 52 at its outer rear end and on which is engaged a rearwardly projecting tubular cage 51. The outer end of the cage 51 is closed by an annular keeper ring 52, which ring is threaded into the cage and is provided with a central stem receiving opening 53.

Arranged within the cage 51 is a rubber carrier lock 54 in which is arranged a load cell or transducer 55. The load cell 55 has a pair of leads 56 which project laterally therefrom and outwardly through the carrier block and through a suitable lateral port provided in the wall of the cage.

The block 54 occurs adjacent the end of the pin 50 on the ram, is held captive within the sleeve-like cage and is clear of the ring 52.

A load supporting stem 57 is slidably engaged in the opening 53 in the ring 52 and is provided at its inner end with an enlarged head 58, which head is slidably engaged in the cage and bears against the rear or outer side of the carrier block 54 in which the load cell 55 is arranged. The outer rear end of the stem 57 is provided with a clevis 59, which clevis is pivotally connected with and carries a suitable road-engaging pad or foot 60.

With the structure set forth above, it will be apparent that the ram 41 is provided with and carries a transducer or load cell unit which is normally unloaded, that is, it is normally not subjected to any adverse or detrimental forces and the like. It will be further apparent that the structure provided is such that when the jack J is shifted to a vertical position and is actuated or put into operation, all of the forces exerted by the truck, onto and through the jack, are directed onto and through the carrier block and the load cell therein.

It is to be understood that in practice the manner in which the load cell is arranged and acted upon can vary widely without departing from the spirit of this invention and that the particular structure illustrated and described is only typical of one carrying out of the invention.

The cylinder and ram or jack unit J is a double acting unit, that is, it is such that upon the introduction of fluid into the cylinder 40, the unit can be caused to extend and exert the necessary work energy to lift the work with which the jack is related, and is such that upon evacuating or drawing fluid from within the cylinder 40, the unit can be caused to shorten the retract.

The longitudinal extent or length of the jack unit J, with the transducer or load cell means, and with the road engaging foot or pad 60 related thereto, is such that when the unit is in its fully collapsed or retracted position and is arranged vertically below the axle 11, such as is illustrated in FIG. 2 of the drawings, the road-engaging foot 60 is clear of the roadbed R. Further, the jack unit is such that when it is fully actuated or extended, the foot engages the roadbed and the axle 11 is elevated a sufficient distance or extent to lift the wheels W carried by the axle, clear of the roadbed R.

In addition to the foregoing, the structure that I provide includes drive means M for shifting the jack unit J from its normal horizontal position illustrated in FIG. 3 of the drawings and illustrated in phantom lines in FIG. 2 of the drawings, to its operating position, shown in full lines in FIG. 2 of the drawings.

The drive means M is shown as including a reversible electric motor 65 with a reduction gear 66 carried by the frame and a worm and pinion drive between an output shaft 67 of the reduction gear 66 and the shaft 45 carried by the frame F and which carries the jack J.

The motor and reduction gear are unitized and the unit is shown mounted on the pad portion 31 of the frame F, with the drive or output shaft 67 thereof projecting forwardly through an aperture 68 in the intermediate portion 30 of the frame F. The forward end of the output shaft 67 is provided with and carries a worm gear 69 which gear engages a pinion gear 70 fixed to the adjacent or inner end of the shaft 45.

With the drive means set forth above, it will be apparent that the jack unit can be shifted from one of its positions to the other of its positions by suitably energizing the motor 65.

The structure that I provide further includes switch means for controlling the operation of the motor, which means is shown as involving a pair of limit switches 71 and 72 carried by the mounting bracket 73 fixed to and projecting forwardly from the pad portion 31 of the frame F. The switches 71 and 72 occur adjacent the free end of the shaft 45 and pinion gear 70, in circumferential relationship to the axis of said shaft and gear.

The switches 71 and 72 are adapted to be engaged by an operating finger 73 carried by and projecting axially from the pinion gear 70.

The switches 71 and 72 are normally closed. One switch, for example, the switch 72, is connected between the forward winding (not shown) of the motor 65 and a trunk line 74 connected with the switches 72 of the several units comprising the apparatus. The switch 71 is connected between the reverse winding of the motor (not shown) and a trunk line 75, which line is connected with the switches 71 of the several units comprising the apparatus. The lines 74 and 75 are connected with a two pole control switch 76 supplied with current from a suitable power source, such as a battery 77.

It will be apparent that when the switch 76 is closed in one direction, all of the motors 76 of the apparatus are operated until each of the jack units reaches that position where the switch 71 or the switch 72 carrying the current flow, is opened, whereupon the current flow is shut-off and the motor is de-energized, stopping the jack unit in its desired position.

Upon actuating the switch 76 to its other position, the above operation is reversed.

It is to be noted that the operation of the means M of the several units U is under control of a single switch, which switch can be located at any desired station on the truck and that the operator of the truck need not concern himself with the multiple task of manipulating separate means for each of said units U.

The apparatus provided by the present invention further includes a fluid supply means F, which means involves a fluid pump 80, a reversible motor 81 for driving said pump; a three-position control switch 82, one position of which is open and the other two positions of which are adapted to selectively close the circuit to the two windings of the motor 81.

The switch 82 is connected with and receives current through a powerline 83 extending from the battery 77.

The means F further includes a fluid reservoir 84 connected with one side of the pump and a manifold line 85 connected with the other side of the pump and connected with the fluid lines 48 extending from the several jacks J provided in the apparatus.

With the means F set forth above, it will be apparent that by throwing the switch 82 in one or the other of said other two positions, fluid is delivered to or exhausted from the cylinders 40 of the jack units J to extend or retract the jacks as desired.

The motor, pump, reservoir and switch of the means F can, as illustrated, be arranged in a suitable housing 86 mounted on the frame 10 of the truck tractor A.

In addition to the foregoing, the apparatus that I provide includes a suitable bridge circuit for each of the several weight sensing devices or load cells 55. The major portion of the circuit is contained in a suitable cabinet 87, which cabinet can be located on the truck tractor frame in close and convenient proximity to the housing 76 containing the means F.

The several transducers 55 are connected with or in the circuit in the cabinet by suitable looms extending from the cabinet to the several units U.

In practice, the circuit is such that when the circuit is energized and the several load cells are subjected to external forces, the total of said forces are resolved into a single signal, which signal is transposed into weight units that can be read by the operator, and which inform or apprise him of the gross weight of the entire truck.

The bridge or weighing circuit that I employ can be of any suitable design and does not affect the novelty of the present invention.

In FIG. 6 of the drawings, I have shown a bridge circuit that might be employed in connection with my apparatus and which will be familiar to anyone skilled in the art.

The load cells 55 are shown suitably arranged in their separate bridges and the several bridges are shown suitably connected to and related to each other and with a suitable galvanometer whereby the sought-after result can be attained.

Since the particular circuitry employed is not or does not have to be novel in nature, and can be varied widely without departing from the spirit of this invention, I will not burden the specification with further description of the circuit illustrated.

In operating my apparatus, the truck T is stopped on a relatively flat, level roadbed, the switch 76 of the means M is thrown in that direction to energize the motors 65 to shift the jacks J of the several units U from their normal up or horizontal position to their vertical operating position, where they occur directly below their related axles.

At the point now reached, it should be noted that the stop means established by the stops 29 and 49 on the frame F and cylinder 40 stop and hold the jack units against excessive pivoting. This stopping or holding action is supplemented by the locking effects of the worm and pinion drive.

After the several units U are in their actuated position, the switch 82 is held in that position which energizes the means F to deliver the fluid under pressure to the jacks J of the units U and until the truck is jacked up so that the wheels W clear the roadbed. This is seldom, if ever, more than three inches since the truck is being jacked up by its axle, not by the frame.

When the truck is thus jacked up, the bridge circuit is energized and the operator reads the information provided, he reads what the gross weight of the truck is.

Having ascertained the desired information, the bridge circuit is shut-off, the switch 82 of the means F is held in its other position to cause the means M to shift the jacks J of the units U to their up or normal position.

It is important to note that the load cells 55 are only subjected to external forces when the truck is stationary and the jacks have been actuated to elevate or lift the truck.

It is also important to note that the units U provided are relatively flat units (when in their normal position) so that when they are mounted to the underside of the truck axle, adequate clearance exists between the units and the roadbed R.

In practice, greater clearance occurs between the roadbed and the universal housing for the drive axles of the truck with which the apparatus is related.

It is also important to note that the horizontal dimensions of the units U, both laterally and longitudinally relative to the truck, are small and are such that the units can be advantageously applied to the ordinary or conventional truck axle without requiring any modification of the basic truck structure.

Having described only a typical preferred form and application of my invention, I do not wish to be limited or restricted to the specific details herein set forth, but wish to reserve to myself any modifications or variations that may appear to those skilled in the art and which fall within the scope of the following claims.

Having described my invention, I claim:

1. An apparatus for weighing an elongate truck having a plurality of longitudinally spaced, transversely extending axles with roadbed engaging wheels at their opposite ends, said apparatus comprising a jack unit fixed to each end portion of each axle, each jack unit including a cylinder and ram unit, means at one end of the cylinder pivotally supporting the cylinder and ram unit for movement between an unactuated horizontal portion to an actuated vertical position below the axle, a roadbed engaging pad at the free end of the ram, electric means interposed in the cylinder and ram and the ram unit for responding to the magnitude of the load imposed therethrough, and drive means to shift said cylinder and ram unit between said normal and actuated positions, control means connected to said drive means of the jack units to selectively and simultaneously shift said cylinder and ram units to from one of said positions to the other, fluid supply means connected with the several cylinder and ram units to simultaneously and selectively conduct fluid to and from said cylinder and ram units when said units are in their actuated position to extend and retract said unit.

2. An apparatus as set forth in claim 1 wherein, means pivotally supporting said cylinder includes a frame fixed to the underside of the axle and having a pair of spaced, axially aligned bearings, a shaft engaged in and between said bearing and a head on the cylinder to project between the bearings and fixed to the shaft.

3. An apparatus as set forth in claim 1 wherein, means pivotally supporting said cylinder includes a frame fixed to the underside of the axle and having a pair of spaced, axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear.

4. An apparatus as set forth in claim 1 wherein, means pivotally supporting said cylinder includes a frame fixed to the underside of the axle and having a pair of spaced axially aligned bearings, a shaft engaged in and between said bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said shaft extending parallel with the longitudinal axis of the axle, the longitudinal axis of said cylinder and ram unit extending substantially horizontally from one side of the axle when said unit is in its unactuated position and having a normally downwardly projecting stop member adjacent its head and to engage and stop against a downwardly disposed stop on the frame when the unit is shifted to its vertical actuated position.

5. An apparatus as set forth in claim 1 wherein, means pivotally supporting said cylinder includes a frame fixed to the underside of the axle and having a pair of spaced axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said shaft extending parallel with the longitudinal axis of the axle, the longitudinal axis of said cylinder and ram unit extending substantially horizontally from one side of the axle when said unit is in its unactuated position, said motor and reduction gear projecting horizontally from the frame and one side of the shaft, whereby the vertical extent of the jack unit is maintained at a minimum when the structure is unactuated and adequate clearance is maintained between the jack unit and the roadbed.

6. An apparatus as set forth in claim 1 wherein, means pivotally supporting said cylinder includes a frame fixed to the underside of the axle and having a pair of spaced axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said control means including a power line, a pair of trunk lines, a control switch to selectively connect the power lines to said trunk lines, the forward windings of the several motors being connected with one trunk line with first branch lines, the reverse winding of the several motors being connected with the other trunk line with second branch lines, a normally closed first limit switch in each first branch line positioned adjacent the shaft at one side of the axis of the shaft, a normally closed second limit switch in each second branch line positioned adjacent the shaft at one side of the axis of the shaft and spaced 90° from the first limit switch and a switch actuating finger related to the shaft and adapted to engage and open the limit switches when the drive means is energized and when the cylinder and ram units reach their actuated or normal positions.

7. An apparatus as set forth in claim 1 wherein, means pivotally supporting said cylinder includes a frame fixed to the underside of the axle and having a pair of spaced axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said control means including a power line, a pair of trunk lines, a control switch to selectively connect the power lines to said trunk lines, the forward windings of the several motors being connected with one trunk line with first branch lines, the reverse winding of the several motors being connected with the other trunk line with second branch lines, a normally closed first limit switch in each first branch line positioned adjacent the shaft at one side of the axis of the shaft, a normally closed second limit switch in each second branch line positioned adjacent the shaft at one side of the axis of the shaft and spaced 90° from the first limit switch and a switch actuating finger related to the shaft and adapted to engage and open the limit switches when the drive means is energized and when the cylinder and ram units reach their actuated or normal position, said shaft extending parallel with the longitudinal axis of the axle, the longitudinal axis of said cylinder and ram unit extending substantially horizontally from one side of the axle when said unit is in its unactuated position and having a normally downwardly projecting stop member adjacent its head and to engage and stop against a downwardly disposed stop on the frame when the unit is shifted to its vertical actuated position.

8. An apparatus as set forth in claim 1 wherein, means pivotally supporting said cylinder includes a frame fixed to the underside of the axle and having a pair of spaced axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said control means including a power line, a pair of trunk lines, a control switch to selectively connect the power lines to said trunk lines, the forward windings of the several motors being connected with one trunk line with first branch lines, the reverse winding of the several motors being connected with the other trunk line with second branch lines, a normally closed first limit switch in each first branch line positioned adjacent the shaft at one side of the axis of the shaft, a normally closed second limit switch in each second branch line positioned adjacent the shaft at one side of the axis of the shaft and spaced 90° from the first limit switch and a switch actuating finger related to the shaft and adapted to engage and open the limit switches when the drive means is energized and when the cylinder and ram units reach their actuated or normal positions, said fluid supply means including a fluid reservoir, a reversibly motor driven pump having one side connected with the reservoir, a fluid manifold line connected with the other side of the pump and a fluid delivery line connected between each cylinder and the fluid manifold line, said cylinder and ram units being double acting, whereby said units can be extended and contracted by conducting fluid into and out of the cylinders with the fluid supply means.

9. An apparatus as set forth in claim 1 wherein, means pivotally supporting said cylinder includes a frame fixed to the underside of the axle and having a pair of spaced axially aligned bearings, a shaft engaged in and between said bearings and a head on the cylinder to project between the bearings and fixed to the shaft, said drive means including a reversible electric motor with a reduction gear carried by the frame adjacent one end of the shaft, a pinion gear on said one end of the shaft and a worm gear driven by the reduction gear and driving said pinion gear, said control means including a power line, a pair of trunk lines, a control switch to selectively connect the power lines to said trunk lines, the forward windings of the several motors being connected with one trunk line with first branch lines, the reverse winding of the several motors being connected with the other trunk line with second branch lines, a normally closed first limit switch in each first branch line positioned adjacent the shaft at one side of the axis of the shaft, a normally closed second limit switch in each second branch line positioned adjacent the shaft at one side of the axis of the shaft and spaced 90° from the first limit switch and a switch actuating finger related to the shaft and adapted to engage and open the limit switches when the drive means is energized and when the cylinder and ram units reach their actuated or normal positions, said fluid supply means including a fluid reservoir, a reversibly motor driven pump having one side connected with the reservoir, a fluid manifold line connected with the other side of the pump and a fluid delivery line connected between each cylinder and the fluid manifold line, said cylinder and ram units being double acting, whereby said units can be extended and contracted by conducting fluid into and out of the cylinders with the fluid supply means, said shaft extending parallel with the longitudinal axis of the axle, the longitudinal axis of said cylinder and ram unit extending substantially horizontally from one side of the axle when said unit is in its unactuated position and having a normally downwardly projecting stop member adjacent its head and to engage and stop against a downwardly disposed stop on the frame when the unit is shifted to its vertical actuated position.

10. An apparatus as set forth in claim 1 wherein, said electric means comprises a sensitive electro-mechanical transducer interposed between the road engaging pad and its adjacent end of the ram, said transducer being responsive to loads applied thereto to produce electrical output variable in accordance with the loads.

11. An apparatus as set forth in claim 1 wherein, said electric means comprises a sensitive electro-mechanical transducer interposed between the road engaging pad and its adjacent end of the ram, said transducer being responsive to loads applied thereto to produce electrical output variable in accordance with the loads, said transducer being carried by a rubber block held captive in a tubular cage on the ram and against the end of the ram, said road engaging pad having a load supporting stem slidably engaged in the cage to oppose the end of the ram and engaging the rubber block.

12. An apparatus as set forth in claim 1 wherein, said electric means comprises a sensitive electro-mechanical transducer interposed between the road engaging pad and its adjacent end of the ram, said transducer being responsive to loads applied thereto to produce electrical output variable in accordance with the loads, said transducer being carried by a rubber block held captive in a tubular cage on the ram and against the end of the ram, said road engaging pad having a load supporting stem slidably engaged in the cage to oppose the end of the ram and engaging the rubber block, said drive means including a reversible electric motor with a reduction gear carried by the frame adjacent one end of the shaft, a pinion gear on said one end of the shaft and a worm gear driven by the reduction gear and driving said pinion gear.

13. An apparatus as set forth in claim 1 wherein, said electric means comprises a sensitive electro-mechanical transducer interposed between the road engaging pad and its adjacent end of the ram, said transducer being responsive to loads applied thereto to produce electrical output variable in accordance with the loads, said transducer being carried by a rubber block held captive in a tubular cage on the ram and against the end of the ram, said road engaging pad having a load supporting stem slidably engaged in the cage to oppose the end of the ram and engaging the rubber block, said fluid supply means including, a fluid reservoir, a reversible motor driven pump having one side connected with the reservoir, a fluid manifold line connected with the other side of the pump and a fluid delivery line connected between each cylinder and the fluid manifold line, said cylinder and ram units being double acting, whereby said units can be extended and contracted by conducting fluid into and out of the cylinders with the fluid supply means.

References Cited by the Examiner

UNITED STATES PATENTS 1,279,500  9/1918  Berry.

FOREIGN PATENTS 630,733  11/1961  Canada.

RICHARD B. WILKINSON, *Primary Examiner.*